United States Patent [19]

Guiton

[11] Patent Number: 5,069,737

[45] Date of Patent: Dec. 3, 1991

[54] STRUCTURAL MATERIALS

[75] Inventor: Jeremy D. L. Guiton, London, United Kingdom

[73] Assignee: Shell Internationale Research Maatschappij B.V., The Hague, Netherlands

[21] Appl. No.: 449,180

[22] Filed: Dec. 13, 1989

[30] Foreign Application Priority Data

Dec. 14, 1988 [GB] United Kingdom ............... 8829198

[51] Int. Cl.$^5$ .......................... B31F 1/20; B29C 47/00
[52] U.S. Cl. .................................. 156/210; 156/227; 156/245; 428/166; 428/178; 428/179
[58] Field of Search ..................... 428/166, 178, 179; 156/163, 172, 210

[56] References Cited

U.S. PATENT DOCUMENTS

| 3,334,007 | 8/1967 | Flagan | 428/166 |
| 4,167,598 | 9/1979 | Logan et al. | 428/178 |
| 4,606,955 | 8/1986 | Eastman et al. | 428/178 |
| 4,707,393 | 11/1987 | Vetter | 428/178 |
| 4,849,269 | 7/1989 | Grace | 428/166 |

FOREIGN PATENT DOCUMENTS

| 864512 | 2/1971 | Canada | 428/178 |
| 2205411 | 5/1974 | France | |
| 2480181 | 10/1981 | France | |
| 546686 | 7/1942 | United Kingdom | 428/166 |

Primary Examiner—William J. Van Balen

[57] ABSTRACT

A stiffener for a panel (40) comprises a fibre/composite box section reinforcement member (42) having a floor (44) laminated to the panel (40) and integrally to the walls of the box which in turn extend outwardly and are laminated to regions of the panel alongside the member (42). The stiffener may comprise several reinforcement members joined together and may further have a further layer of material applied across the top of the members (42) to provide a generally even top surface. A method of forming the stiffeners in glass fibre/resin composite is also disclosed.

1 Claim, 3 Drawing Sheets

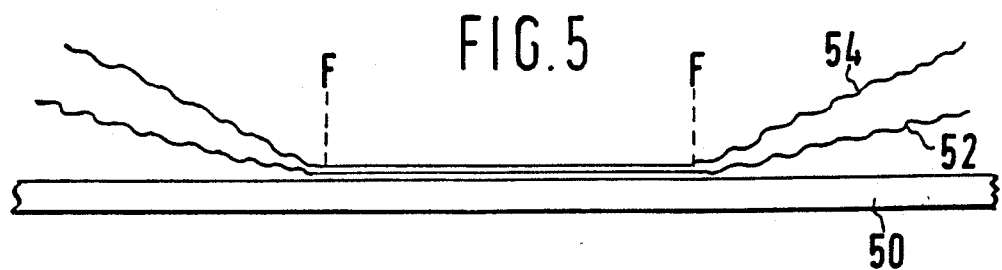
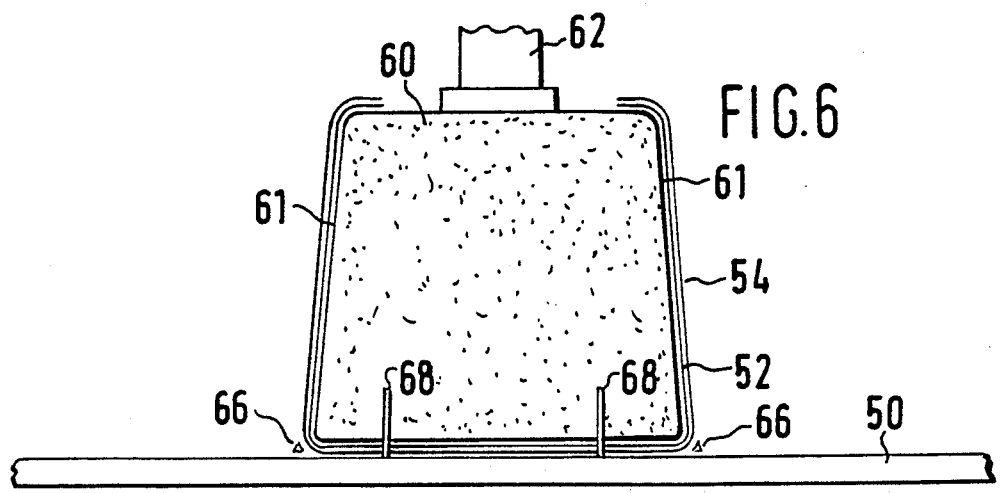
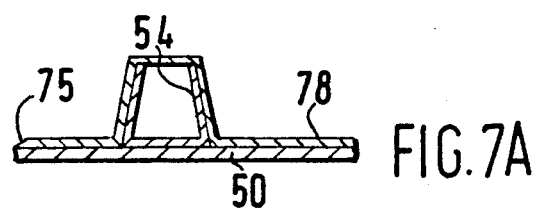
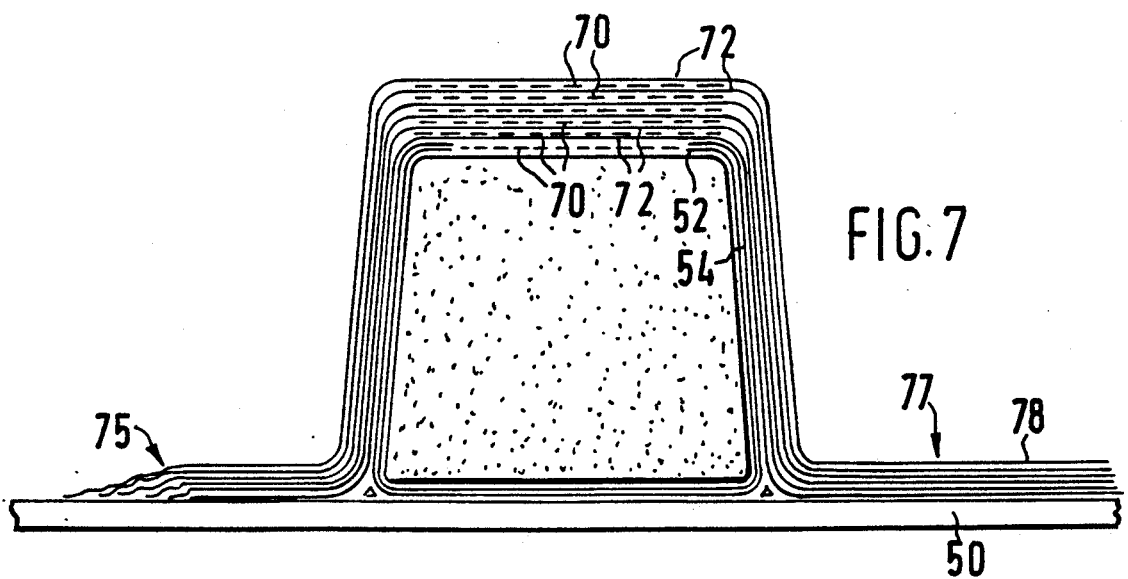

STRUCTURAL MATERIALS

FIELD OF THE INVENTION

This invention relates to structural material and a method of forming a structure having improved strength and more uniform stiffness compared to structures produced by previously used techniques. It is particularly applicable to structural materials and structures made from plastic/fibre composite materials, particularly resin/fibre composites e.g. glass reinforced plastic (GRP).

DESCRIPTION OF THE PRIOR ART

Many types of structure require areas of panelling and it is often necessary for the panelling to be relatively stiff so that it does not sag under its own weight or distort to too great an extent under stress. Panelling can be made stiff by forming it into a curved shape, particularly so that it has a compound curvature, and many structures have been designed with this curvature included. However, where the panelling needs to be flat, e.g. to simplify construction, in order to attain the desired stiffness it can be necessary to use a heavier grade material than would otherwise be required or to add additional stiffeners. This has been found to be particularly necessary in the case of glassfibre reinforced plastic (GRP) panels, which are increasingly being used, particularly in the marine and offshore structure fields. For instance, many boats are designed to use GRP either as a hull material or for the superstructure and while small craft can generally be over-designed to resist rough handling and to have a high degree of compound curvature to provide additional strength and stiffness, as vessel size increases structural problems can arise. This is because it is uneconomic to provide the same degree of over-design in larger craft, and in such craft areas of flat panelling also become larger. The same situation arises in high speed craft which encounter severe operational conditions and require relatively flat planing surfaces. Large areas of flat panelling are also found in super-structures and deck-houses on ships and in modules on offshore rigs and platforms.

With GRP panels high stress levels and large areas of flat panelling tend to lead to greater deflection of the panel under load. It has been found that the panels are then subject to shell surface cracking and even, because of the lack of reinforcement extending through the laminated structure, to inter-laminar debonding.

It is common practice to stiffen such panels by using "top-hat" section stiffeners applied to the panel, as shown in FIG. 1 of the accompanying drawings. These comprise relatively widely spaced, heavy stiffeners of "top hat" section 3 which support a relatively heavy shell panel 1. An alternative practice is a composite panel made from two plane panels 7 and 9 connected by a corrugated panel 11 as shown in FIG. 2. However, in both cases, where the panel is distorted by stress, e.g. as shown dotted above the impacting object 5 in FIG. 1, the panel tends to deflect abruptly about the junctions between the stiffener and panel and the stiffener tends to peel off the panel starting at those junctions, e.g. point A in FIG. 1. The junctions effectively provide a point of stress concentration which aggravates the problem and accelerates the peeling process.

These problems tend to increase in fields where weight-saving is important since thinner higher strength materials, which deflect more easily, are often used in order to save weight. Furthermore, where panels are formed by building-up one layer upon another, e.g. in a GRP panel, the use of thinner panels reduces the time needed for construction and thus the labour costs. These consideration have tended to limit the use of such materials.

SUMMARY OF THE INVENTION

According to the present invention there is provided a method of strengthening a panel by use of an elongate reinforcement member having a surface portion conforming to part of the panel surface, comprising:
  a) applying and laminating the surface portion of the member to the panel surface;
  b) applying and laminating a layer material to the panel and member, the layer extending over surfaces of the reinforcement member left exposed by step a) and at least over regions of the panel laterally to each side of the member.

The member may conveniently be formed on the panel and preferably the layer is applied to the panel and member in such a manner that it melds with the material of the member e.g. by forming the member from the same material as the layer such as a glass fibre/resin composite. The word laminating is intended to cover both processes which use a separate bonding agent to fix the reinforcement member to the panel and as described further here those in which no separate bonding agent is used e.g. where the layers of the panel and member are placed in contact when the resin in at least one is wet, with the other being either wet, or part-or fully-cured. In the latter case some surface treatment will be required to provide a key prior to laminating over.

The reinforcement member may be an elongate hollow member which may be formed on the panel. The hollow member may be filled with foam or other material.

Conveniently in the method the reinforcement member is formed by the steps of:
  applying a mat or fabric of fibre material to the panel, applying resin thereto thereby forming a laminate;
  compacting the laminate;
  placing a former on the resined area of fibre and folding the mat or fabric of fibre to lie along the sides of the former, applying resin thereto and compacting the laminate; and
  wherein the step of applying the layer of material to the panel and member comprises forming a fibre/resin layer extending over regions of the panel alongside the former and over the sides and top of the former.

The layer of fibre/resin may be applied to the panel and member before or after the resined mat or fabric of fibre has hardened and a filler fairing, e.g. a length of fibre and resin, may be positioned along the joint between the panel and former after folding of the fibre mat or fabric to inhibit the formation of spaces between the mat or fabric and layer of fibre/resin.

The layers of fibre/resin on the top of the former may be interleaved with fibre tapes extending lengthwise of the former and the mat or fabric of fibre may extend part-way across the top of the former.

A double skinned panel may be fabricated by further including the step of applying a further layer of fibre/resin material across the top of the formers so that the strengthened panel has a substantially even top surface. Conveniently further formers are positioned between the hollow members to support the further layer. For added strength, further layers of fibre/resin material are included in the structure extending down the side of the formers and along the top of the further formers to affix to the further layer.

This invention also provides a panel including a stiffener comprising an elongate reinforcement member having a surface portion conforming and laminated to part of the panel surface and a layer of material extending over the hollow member and at least over regions of the panel laterally to each side of the member. The panel may include a plurality of reinforcement members. The panel may be formed from a fibre/resin composite, the layer of fibres forming the said surface portion and the layer of material alongside the hollow member also extending up the sides of the member and optionally at least part-way over the top of the member. Layers of fibre of the portions alongside the hollow member may extend completely over the top of the hollow member and tapes may be included extending longitudinally of the hollow member interleaved with the layers on the top of the hollow member.

In order to taper the thickness of the edges of the material alongside the reinforcement member the layers forming it may be laterally offset from one another. Further layers of fibre material extending over other parts of the panel may be joined smoothly by overlapping the tapering edge.

The invention may also provide a double sided strengthened panel comprising a plurality of reinforcement members as mentioned above and further comprising a further layer of fibre/resin composite materials extending across the top of the member to form a generally even surface. It may also include layers of fibre/resin material extending down the sides of the members and along the said further layer in the regions between the members. These regions may be filled with structural foam or foam or GRP or hollow GRP preforms. The same material may also be used as formers to form the hollow members.

The invention will be further described by way of non-limitative example with reference to the accompanying drawings.

IN THE DRAWINGS

FIG. 5 shows one stage of forming an embodiment of the present invention;

FIG. 6 shows a second stage of forming an embodiment of the present invention;

FIG. 7 and 7A shows a third stage of forming an embodiment of the present invention.

DESCRIPTION OF THE PREFERRED EMBODIMENTS

Figure 1:
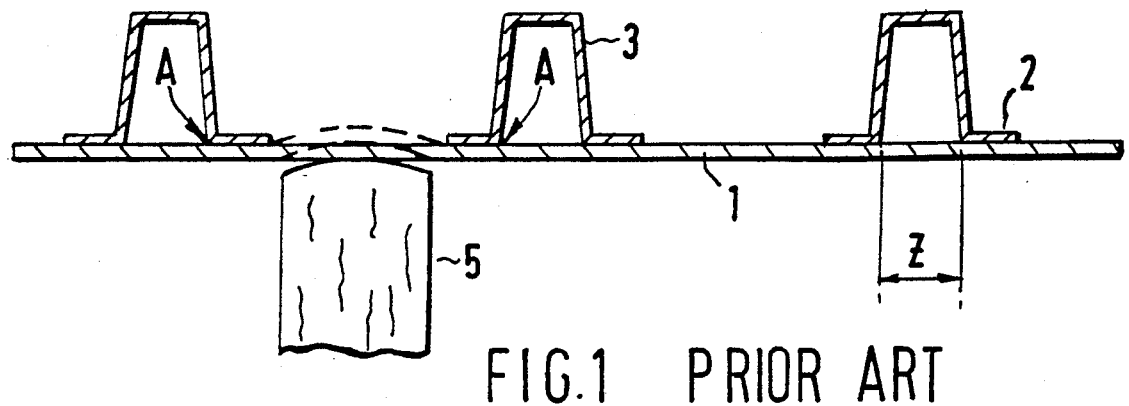
FIG. 1 illustrates a prior art construction.
Figure 3:
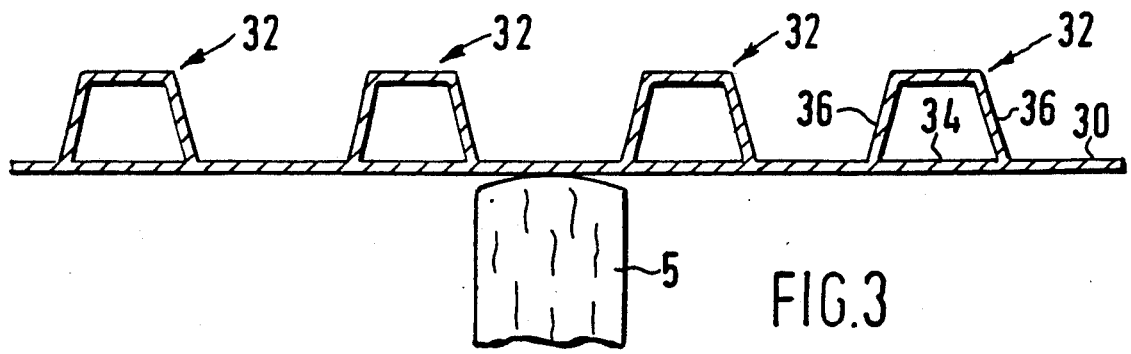
FIG. 3 shows a construction according to a first embodiment of the present invention.

FIGS. 3 shows a construction panel according to a first embodiment of the present invention and which comprises a planar panel part 30 which is formed integrally with several elongate reinforcement members 32 on one surface. The hollow reinforcement members are formed integrally with the panel so that the floor 34 of each member is integral with the walls 36 and forms part of the panel 30. A method of achieving this structure in GRP, i.e. using glass fibre and resin, will be described below. It has been found that this structure is considerably stronger, of more uniform stiffness and more impact-resistant than the prior art construction illustrated in FIG. 1 and it is thought that this is because the panel has a very high resistance to peeling or debonding between the reinforcement members and the flat panel section.

Figure 4:
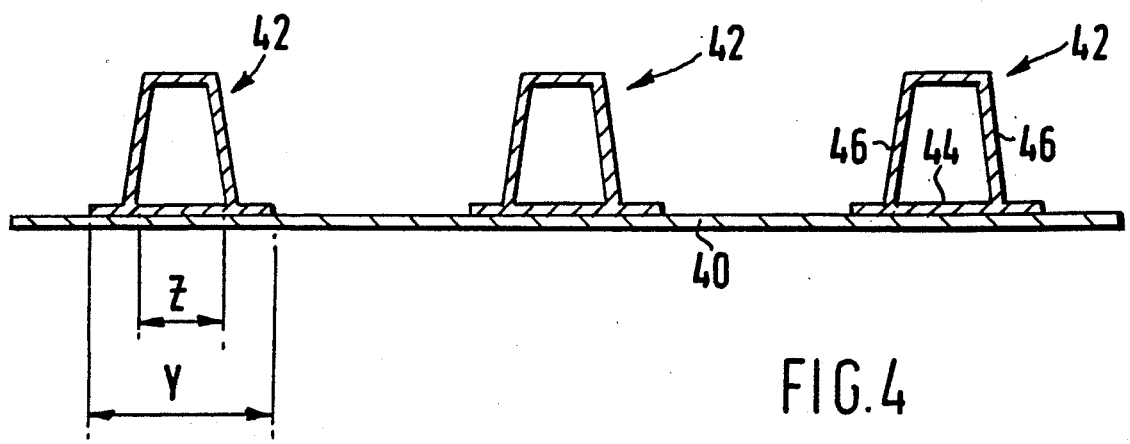
FIG. 4 shows a construction according to a second embodiment of the present invention.

The invention may also be applied to the stiffening of an existing panel as shown in FIG. 4. As illustrated, a panel 40 is stiffened by the laminating thereto of several reinforcement members which are formed by box section stiffeners 42. In each of these box section stiffeners the floor 44 is formed integrally with the walls 46, which also extend outwardly on each side to provide a total laminated adhesion area "Y" with the panel 40 which is larger than the laminated adhesion area of the prior art construction in FIG. 1 by the amount "Z".

As mentioned above, this invention is particularly suited for use in fibre/resin composite materials and in particular to construction using glass fibre. A method of achieving the construction of the present invention will now be explained with reference to FIGS. 5, 6 and 7.

Firstly the shell 50 is laid-up and allowed to harden, but not fully cure. Then it is defined where the stiffening box sections will be provided and the positions of the edges of the formers which will be used to form those box sections are marked, for example at the points marked F in FIG. 5. Then two mat or fabric layers of fibre 52 and 54, which are larger than the floor area of the former, are positioned over the marked areas and wetted out and compacted between the former edge lines. The term "wetting out" is used in the GRP art to mean the application of resin to the fibre matting or fabric.

Then the former 60, which may be of non-structural rigid foam, structural foam, hollow GRP or any other material suitable for the purpose, is placed in position and weighted or secured in position using weights, clamps or shores 62. Anti-slide pins 68 of plastic or other material may be prefitted in the former 60 if required so as to prevent former movement prior to resin gelation. Resin is then applied to the side 61 and part of the top of the former 60 and the two mat or fabric layers 52 and 54 are wrapped around the former, wetted out and consolidated in the normal way. As will be appreciated from FIG. 6 the exterior bottom corners of the structure so formed are concave and so in order to prevent a gap forming here when the rest of the structure is built up, filler fairings 66 are placed alongside the structure in the join between the mats 52, 54 and the panel 50. These may be roving tows i.e. lengths of fibre, which are then impregnated with resin. This structure is then allowed to harden.

Subsequently the weights or securing devices 62 are removed and fibre tape 70 is laid-up on top of the former. Subsequent "top-hat" layers of fibre 72 are then laid-up in the normal way, interleaving with fibre tapes 70. These layers 72 are arranged to lap onto the shell 50 on either side of the former as well as extending continuously over the former. The cloths 72 are successively displaced sideways as they are laid so that either a tapering edge 75 which is suitable for producing the arrangement in FIG. 4, or a scarf-joint (i.e. an end-to-end joint with the pieces shaped to overlap one another with further layers of fibre 78 extending across the shell) can be achieved. The further layers of fibre 78 may, if required, extend to and/or over further box sections. In this way the structure shown in FIG. 3 can be achieved.

FIG. 7A shows in simple form the layers of fibre of the FIG. 7 structure.

It would be possible to achieve a similar construction to the above by pre-wrapping wetted out mat or fabric layers of fibre 52 and 54 around the former prior to locating the formers on the shell. Such a method, however, has the disadvantage that areas of poor or nil adhesion and unreinforced resin would be formed in the region between the former and panel whenever panel surface irregularity, curvature or air entrapment occurred.

Figure 2:
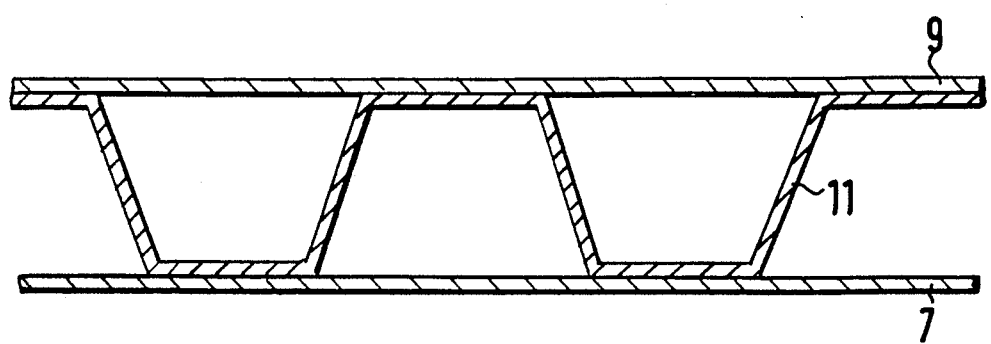
FIG. 2 illustrates a further prior art construction.

The invention may also be applied to a double skin structure which has two even surfaces, rather than one and one corrugated. A prior art proposal for a corrugated core panel is shown in FIG. 2 but as can be seen less than 50% of the surface of each of the skins is secured to the corrugated stiffening member.

The fabrication of a double skin construction according to a further embodiment of the present invention will be described with reference to FIGS. 8 (A) to (L).

This comprises a wet-on-wet lay-up as opposed to partly wet-on-dry lay-up described with reference to FIGS. 5, 6 and 7. The methods are however interchangeable.

First, the first face skin laminate 80 is laid-up as in FIG. (A). Then, as in FIG. 8 (B), the locations F of the set of core formers 82 are marked on the skin 80. Alternatively they may be pre-marked on the underlying mould surface to facilitate a wet-on-wet lay-up employing clear resin. Strips of MELINEX (or similar material unaffected by resin) 84 (FIG. 8 C) are then positioned along the line of the edges of the core formers.

Layers of fibre and resin 86 are then laid-up with the edges overlapping the masking strips 84. The layers 86 are built up to the required thickness with the region between the strips being consolidated and any voids being rolled out. Then, see FIG. (E), the core formers are secured in position and, see FIG. 8 (F), the masking strips 84 are raised to press the edges of the laminate layers against the sides of the core formers 82, which have been pre-wetted with resin. The masking strips are removed and the laminate consolidated.

Figure 8:
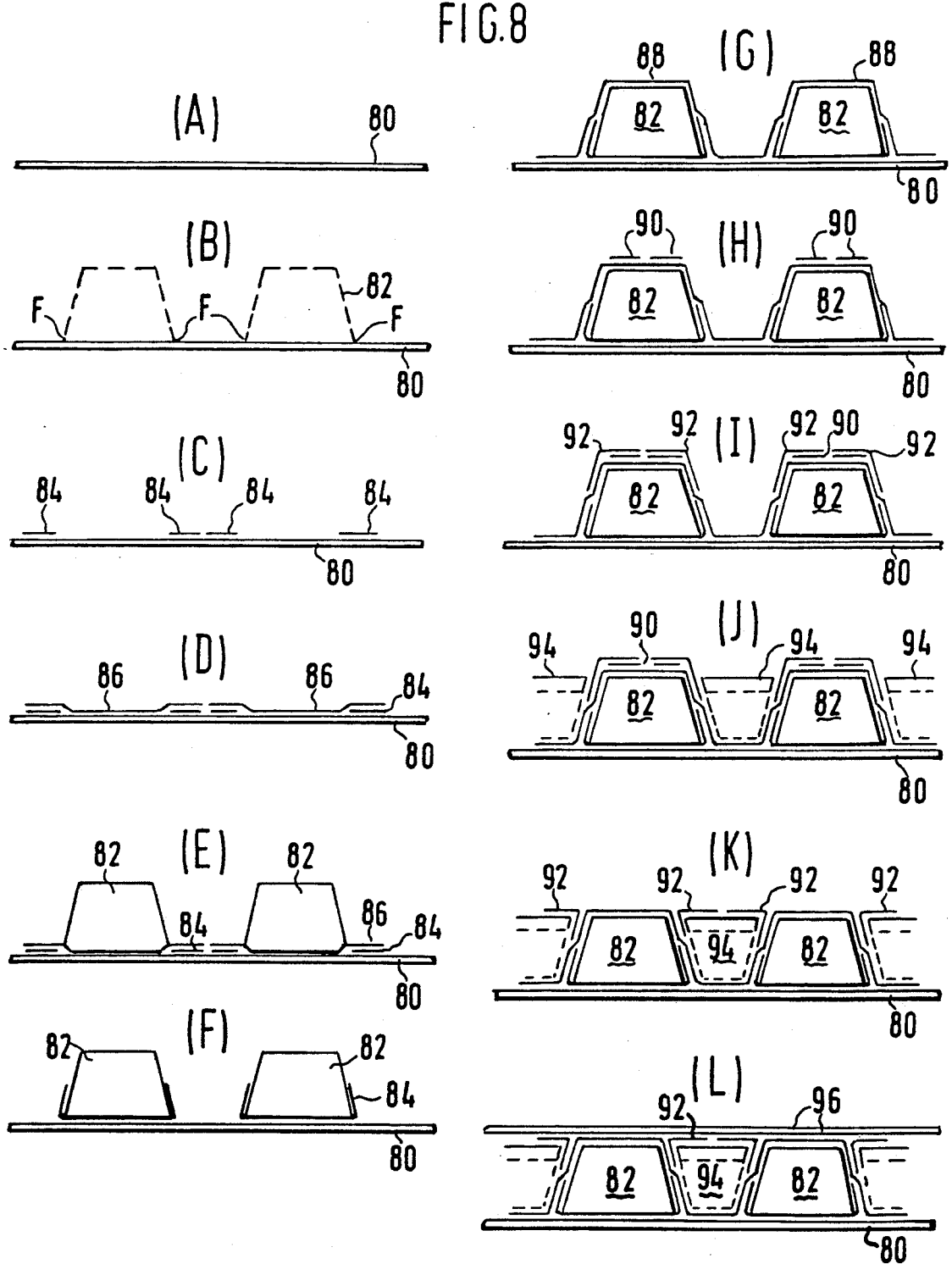
FIGS. 8 (A) to (L) show the steps of forming a third embodiment of the present invention.

Then, as shown in FIG. 8 (G), layers of fibre and resin 88 are laid-up extending over the formers and lapping onto the shell 80 alongside the formers. Further masking strips 90, e.g. of MELINEX are positioned along the crowns of the raised sections and further layers of fibre and resin 92 are laid on top of these overlapping the top sides of the raised sections as shown in FIG. 8 (I). These layers 92 are built up to the required thickness and the regions on the top sides of the raised sections consolidated and voids rolled out.

As shown in FIG. 8 (J) formers 94 to support the top skin layer are then positioned in the regions between the raised sections. These formers 94 may be of similar nature to the formers 82 and chosen to be of any suitable height to give the required top surface shape e.g. smooth or slightly corrugated. The masking strips 90 are than raised and the layers 92 folded onto the top of the formers 94, which have been pre-wetted with resin. The masking strips are removed and the laminate consolidated on top of the formers 94 as shown in FIG. 8 (K). Finally, the second face skin laminate layer 96 is laid-up to be required thickness as shown in FIG. 8 (L).

This method can be repeated for manageable lengths of core former and core and, if larger panels are required, adjacent lengths may be joined together by scarfing, strapping or lapping as convenient. The same method can also be applied to more widely spaced individual core stiffners within a double skin (sandwich) laminate which would not be entirely solid but would have hollow regions between the positions of the formers.

The present invention, as described above, achieves a more balanced stiffener to shell connection than the prior art methods and this construction reduces the tendency of the stiffeners to peel away from the shell. Furthermore, an increased area of adhesion is provided between the stiffener and the shell and the area is symmetrically disposed about the centre line of the stiffener webs. In fact, 100% of the projected area of the stiffener is adhering to the shell whereas in the prior art construction in FIG. 1 only the turned-out flanges 2 are adhering to the shell and these can represent less than 50% of the total projected area of the stiffener.

The invention may be used in a construction using a fibre/resin composite material with any type of suitable resin e.g. high strength, high extension to failure (compliant) or fire resistant resins, either singly or in combination.

For example a further improvement in impact resistance would be achieved by employing a compatible compliant resin in the laminate plies adjacent to the interface between reinforcement member and panel.

I claim:

1. A method of forming a double skin construct panel, said method comprising the steps of:

laying up a first face skin laminate;
   marking the locations of a first set of core formers on the first face skin laminate;
   positioning strips of lower masking strip over the marked locations of the first set of core formers;
   layers up lower layers of fiber and resin with the edges of the lower layers overlapping the lower masking strips;
   securing the first set of core formers in position above the lower layers of fiber and resin, the core formers spaced evenly from the edges of the lower edges of fiber and resin;
   raising the lower masking strips so as to press the edges of the lower layers of fiber and resin against the sides of the first set of core formers;
   removing the lower masking strips;
   laying up continuous layers of fibers and resin over the top of the first set of core formers, the continuous layers lapping onto the first face skin laminate alongside the first set of formers;
   positioning upper masking strips along the crowns of the first set of core formers, on top of the continuous layers of fiber and resin
   laying up upper layers of fiber and resin on top of said upper masking strips, the upper layers overlapping the top sides of the core sections,
   positioning a second set of core formers in the regions between the first set of core formers;
   raising the upper masking strips to fold the upper layers of fiber and resin on top of the second set of core formers;
   removing the second set of masking strips; and
   laying up a second face skin laminate on top of the upper layers of fiber and resin contacting the second set of core formers, and on top of the continuous layer of fiber and resin on top of the first set of core formers.

* * * * *